Feb. 28, 1939.  W. E. URSCHEL  2,148,916
POWER CULTIVATING AND WEEDING MACHINE
Filed April 13, 1936  5 Sheets-Sheet 3
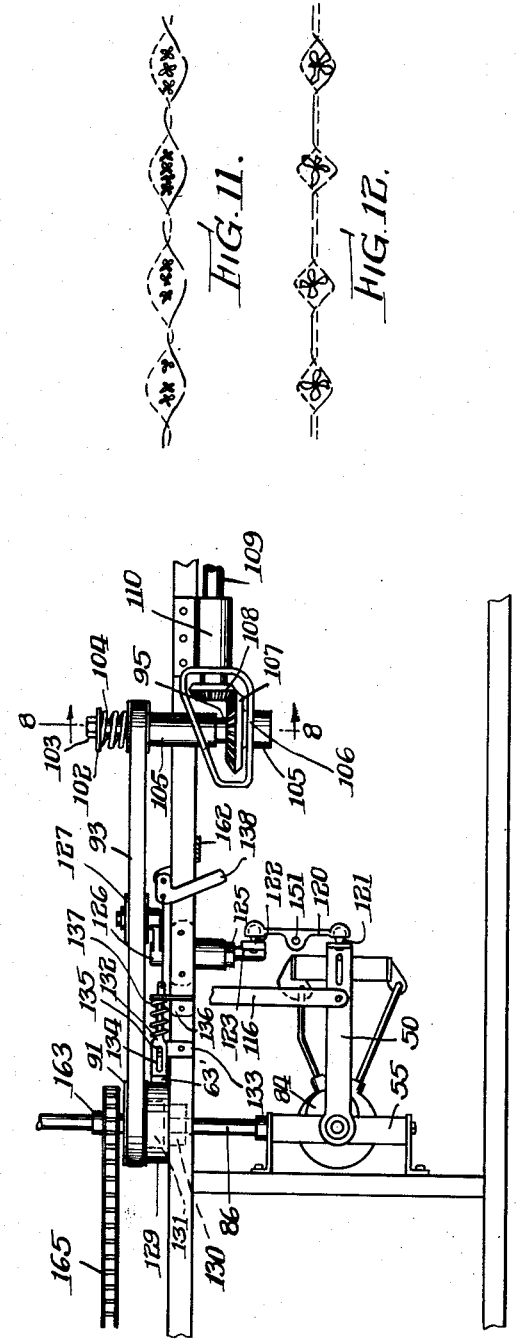
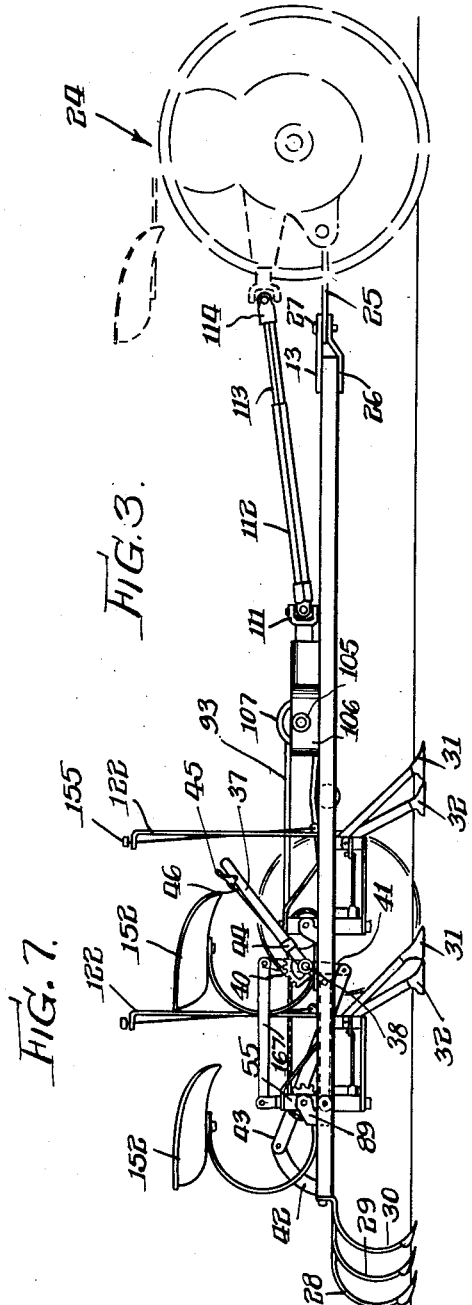
INVENTOR.
William E. Urschel
BY Cox & Moore
ATTORNEYS.

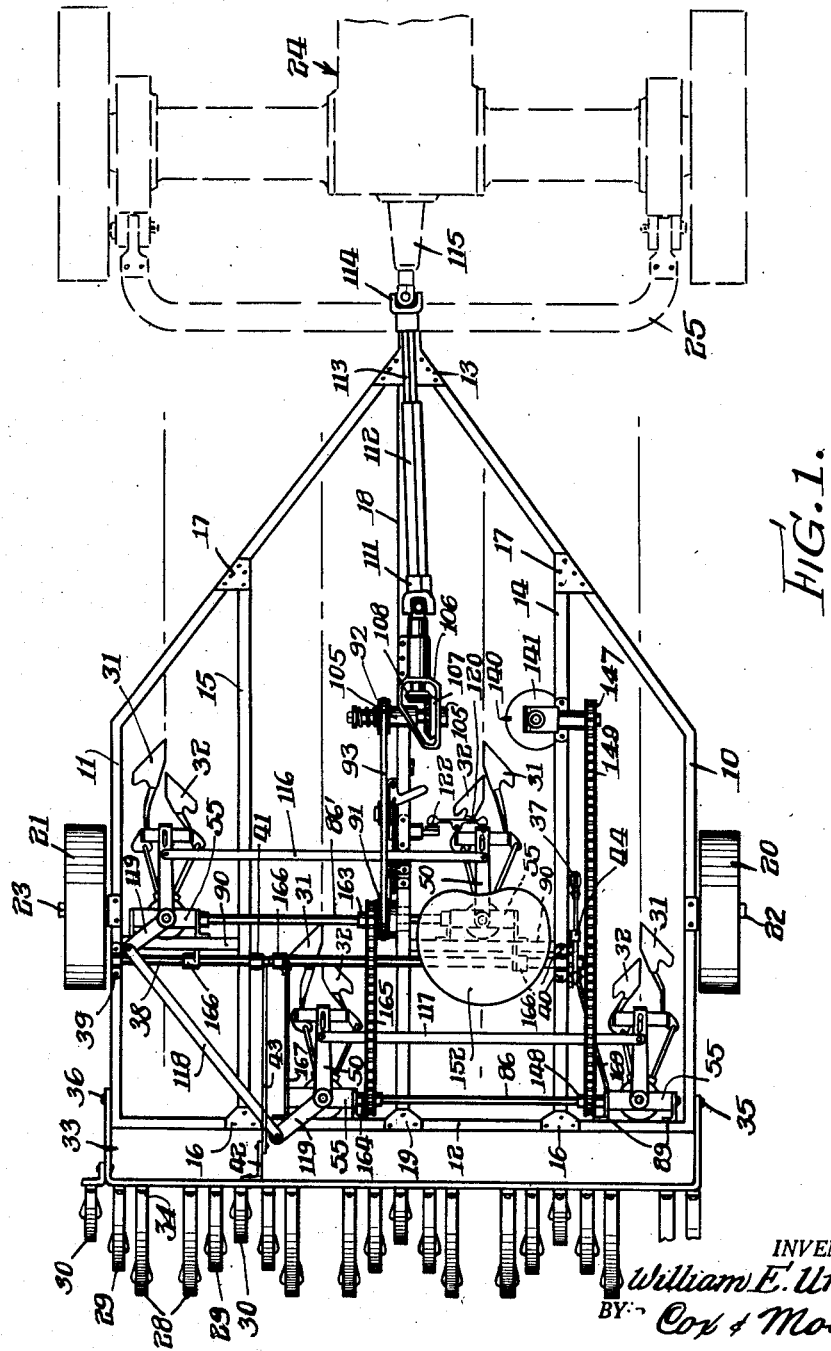

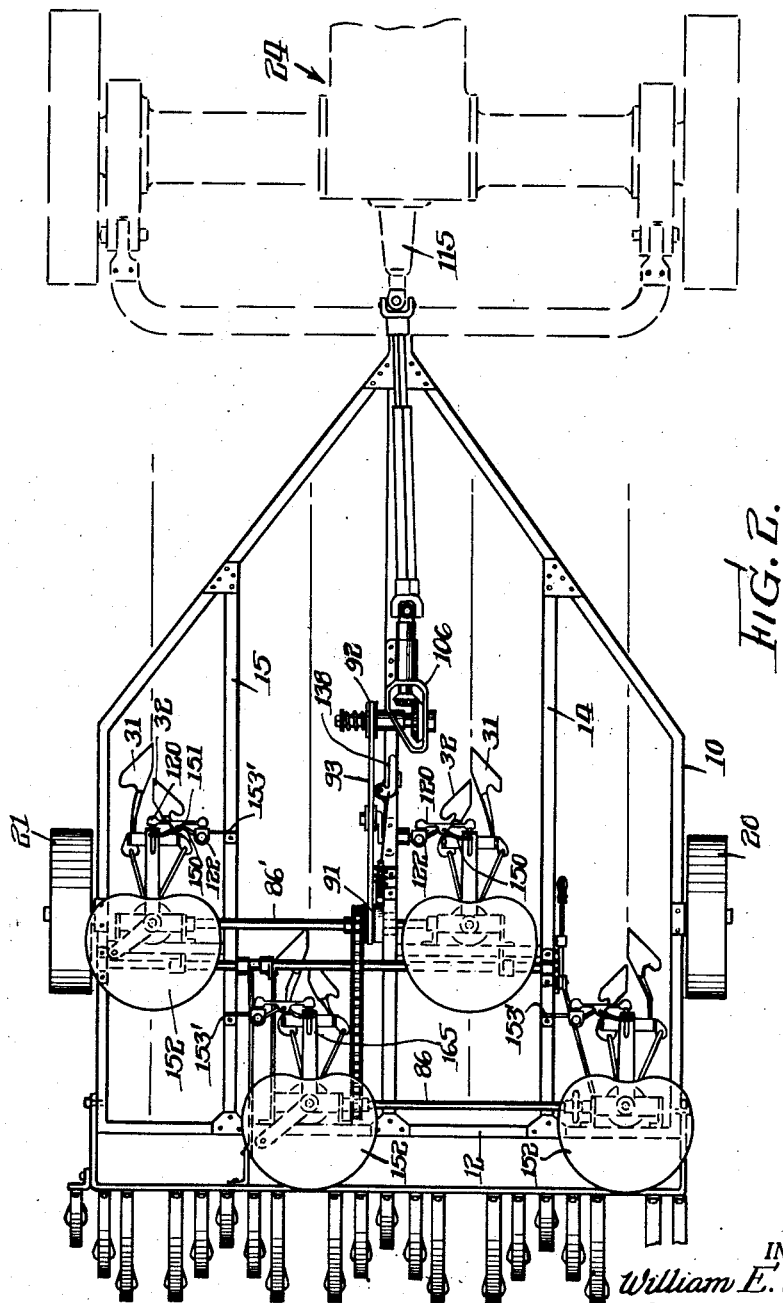

Feb. 28, 1939.  W. E. URSCHEL  2,148,916
POWER CULTIVATING AND WEEDING MACHINE
Filed April 13, 1936  5 Sheets-Sheet 4
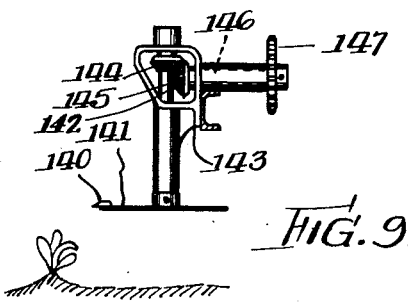
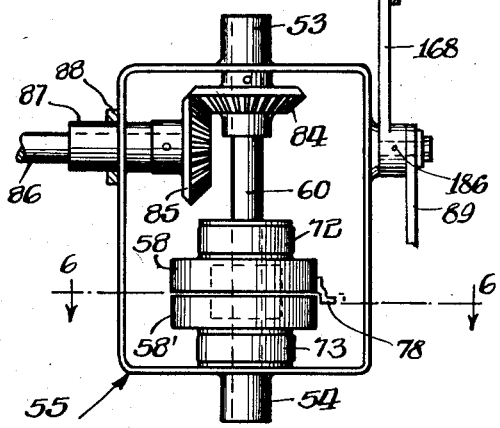
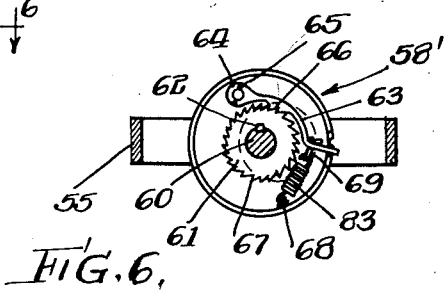
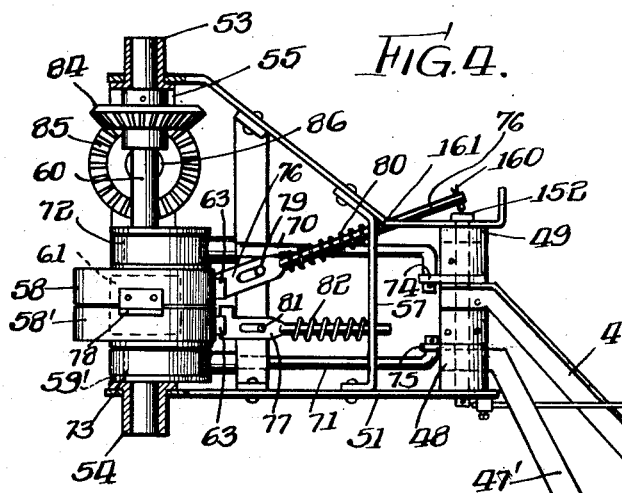
INVENTOR.
William E. Urschel
BY Cox & Moore
ATTORNEYS.

Feb. 28, 1939. W. E. URSCHEL 2,148,916
POWER CULTIVATING AND WEEDING MACHINE
Filed April 13, 1936 5 Sheets-Sheet 5

Inventor:-
William E. Urschel
By:- Cox & Moore attys.

Patented Feb. 28, 1939

2,148,916

UNITED STATES PATENT OFFICE 2,148,916

POWER CULTIVATING AND WEEDING MACHINE

William E. Urschel, Valparaiso, Ind.

Application April 13, 1936, Serial No. 74,055

22 Claims. (Cl. 97—19)

My invention relates to machines for cultivating and/or blocking plants, vegetables, and especially sugar beets which are grown in rows.

In the cultivation of sugar beets and similar plants which are drill planted in rows, three cultivating steps, or operations, are commonly employed. The first of these cultivating steps or operations comprises selective elimination of certain plants in each row to leave regularly spaced hills, each containing one or more plants. The second of the cultivating steps comprises the elimination of weeds between the regularly spaced hills of plants and the working of the ground between such hills. In the third step in the cultivation, portions of the hills are removed to leave one plant in each hill.

It is an object of applicant's invention to provide a single machine for performing all these cultivating operations.

It is a further object of applicant's invention to provide a machine for cultivating plants grown in rows, which will automatically and periodically make hills at predetermined, spaced distances apart, cultivating or blocking out the intervening portions of the row of plants.

It is a further object of applicant's invention to provide, in a machine of the character described, means for simultaneously cultivating a plurality of rows of plants.

It is another object of applicant's invention to provide in a cultivating machine embodying power actuated cultivators, adjustable means for maintaining the movement of the cultivators in synchronism with the longitudinal movement of the machine along the row of plants, whereby in the use of the machine for the performance of the second cultivating step the preservation of the plants under cultivation will be insured.

It is a further object of the invention to provide in a cultivating machine embodying a plurality of cultivators for the simultaneous cultivation of a number of rows of plants, means for operating the units both simultaneously and individually, as required.

It is another object of applicant's invention to provide in a cultivating machine embodying a power driven cultivator, manually controlled means for determining the operation of the cultivator to remove a certain portion of a hill of plants.

A further object of the invention is to provide a cultivating machine wherein the cultivator unit comprises two cultivator elements arranged in staggered relation and having paths of travel which intersect to effect a complete cultivation of the ground between the plants to be cultivated.

A further object of the invention is to provide a cultivating machine wherein the cultivator shall be manually adjustable relative to the frame of the machine to maintain the cultivator in line with the longitudinal axis of the row of plants to be cultivated.

Other and further objects and advantages of the invention will be apparent from the description which follows.

Referring now to the drawings in detail.

Fig. 1 is a plan view of the preferred embodiment of my machine, illustrating the device when controlled by one operator.

Fig. 2 is a plan view of the machine when controlled by four operators.

Fig. 3 is a side elevation of the machine.

Fig. 4 is a side elevation in partial section illustrating the plow actuating mechanism.

Fig. 5 is a rear view of the frame-supporting mechanism illustrated in Fig. 4.

Fig. 6 is a sectional view taken on the line 6—6 of Fig. 5.

Fig. 7 is a part plan view of a main drive and clutch mechanism.

Fig. 8 is a transverse section of the V-shaped, grooved drive pulley taken on the line 8—8 of Fig. 7.

Fig. 9 is a rear view of the synchronizing, indicating device.

Fig. 10 is a side elevation of the plow actuating control lever.

Fig. 11 is a diagrammatic view of the plow illustrating the action of the plows when they are automatically controlled.

Fig. 12 is a diagrammatic illustration of the course of the plows when manually controlled.

Figure 13:
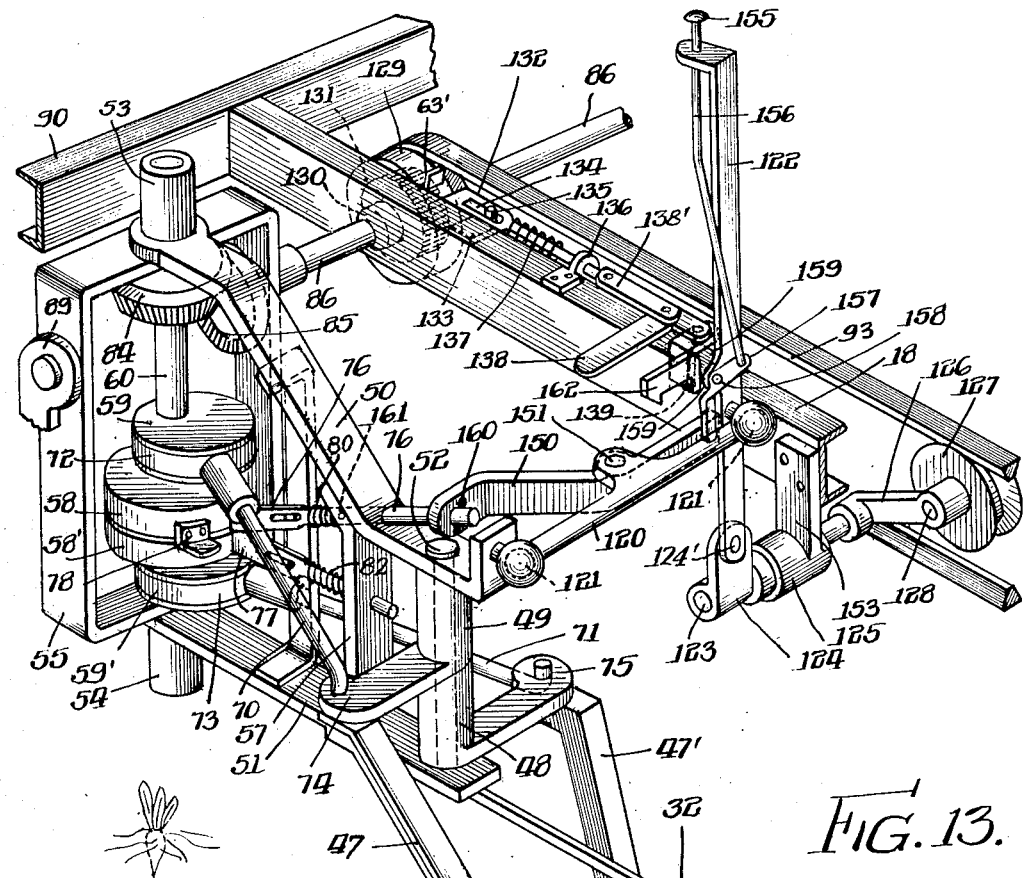
Fig. 13 is an expanded perspective view of the mechanism illustrated in Fig. 4.
Figure 14:
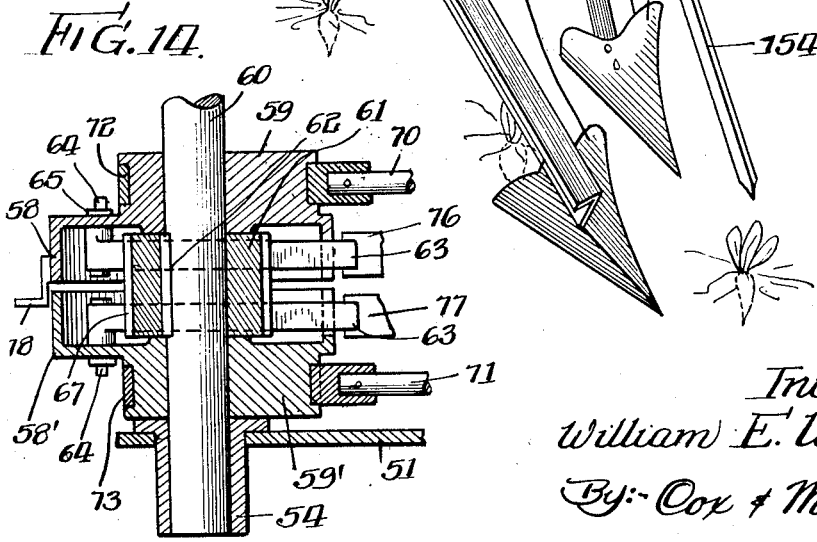
Fig. 14 is a sectional view taken through the clutch mechanism shown in Figs. 4 and 13.

The preferred embodiment of my invention illustrated in the accompanying drawings comprises a main frame consisting of side members 10 and 11 held in spaced relation at their rear ends by a transverse member 12. The forward ends of the side members 10 and 11 preferably are shaped to converge and are held in position by plates 13 and 26 fastened to said members. There are intermediate longitudinal beams 14 and 15 (see Fig. 1), secured to transverse member 12 by plates 16 and to the converging portions of the side members 10 and 11 by plates 17.

A third longitudinal member 18, preferably positioned midway between the side members 10 and 11, is secured at its forward end to these plates 13 and 26 and fastened at its other extremity to transverse member 12, preferably by means of a plate 19.

The main frame heretofore described is carried along the ground by wheels 20 and 21 connected to the frame by the usual axle brackets 22 and 23. The machine is preferably moved over the ground by means of a farm tractor 24, whose draw-bar 25 may be secured to the frame connector plates 13 and 26 by a pin 27.

Suitably shaped weeding and cultivating mechanism preferably consists of two distinct types of cultivators. First, plows or cultivators 28, 29 and 30 are provided in fixed relation with respect to each other and adapted to work the soil between the rows of the crop. Secondly, shiftable plows, tools or cultivators 31 and 32, there being a plurality of the same—preferably four—are mounted on the machine for movement so that they may be moved around any desired plant or plants in the row of the crop, thereby permitting the working of the soil in between the plants along the approximate center line of each row.

Plows 28, 29 and 30 are held in fixed relation upon the transverse support 33 by bolts 34. This support 33 may be pivotally supported upon the rear ends of frame members 10 and 11 by means of shafts or bolts 35 and 36. These plows 28 to 30, inclusive, may be raised or lowered by means of hand lever 37, pinned or otherwise secured to shaft 38. This latter shaft is rotatably mounted in a bearing 39 fastened to the frame member 11 and in a bracket 40 secured to frame member 14.

A crank 41, pinned to shaft 38, is connected to an arm 42 mounted upon member 33 by a link 43, thus forming the connection between the hand lever 37 and the plow support 33 for operating the latter manually. A detent 44, mounted upon this hand lever 37, is operated by a thumb latch 45 and link 46 and cooperates with notches formed in the bracket 40. This arrangement provides means for holding the points of the plows 28 to 30, inclusive, in any desired position above or below the ground or the surface line of the soil.

In order to permit the cultivators or plows 31 and 32 to be moved vertically, they are mounted upon tiltable frames 55 in the following manner. Each of the four identical frames 55 is pivotally mounted, by a pin 186 and a bearing projection 87 formed upon the frame 55, in circular apertures 88 of supporting brackets 89, the brackets 89 being secured to transverse frame members 12 and 90, as shown in Fig. 1. The tiltable frames 55 may be connected in any conventional manner to the shaft 38 for oscillation thereby. As shown in Figs. 1, 2, 5 and 7 of the drawings, three of the frames 55 are connected to the shaft 38 by means of cranks 166 and links 167 and 168; the fourth frame 55 is connected by a link 169 directly to the extending end of the hand lever 37. It will be apparent from this description that upon operation of the hand lever 37 the rear cultivators 28, 29 and 30 and the plows or cultivators 31 and 32 will be simultaneously raised or lowered. By reason of the detent and toothed bracket, the plows or cultivators may be held in any desired position.

Plow beams 47 and 47', Figure 4, serve to secure plows 31 and 32 to brackets 48 and 49, which are pivotally mounted upon a pin 52 secured in members 50 and 51. Members 50 and 51, which are pivotally mounted upon bearing projections 53 and 54 of the rectangular frame 55, are held in spaced relation by a spacer 57.

Two oppositely disposed, identical housings 58 and 58', Figures 4 and 5, with eccentrically disposed hubs 59 and 59' are rotatably mounted upon a vertically disposed shaft 60, journaled in bearing projections 53 and 54 of the frame 55. Ratchets 61, Figures 5 and 6, enclosed by housings 58 and 58', are each secured to shaft 60 by key 62. Pawls 63 are each pivotally mounted upon a pin 64 secured in the associated housing 58 or 58'. Each pawl 63, which is positioned on the pin 64 by a cotter key 65, is provided with a projection 66 fitted to cooperate with teeth 67 on ratchet 61. Springs 83 secured at one end to each of the housings 58 and 58' at point 68 have their other extremities secured in eyebolts 69 mounted upon pawls 63. This arrangement permits springs 83 to exert a resilient tension upon pawls 63 thereby causing projections 66 to engage with teeth 67 of ratchet 61.

Rods 70 and 71 secured to eccentric straps 72 and 73 have their other extremities pivotally mounted in arms 74 and 75 of the plow support brackets 48 and 49.

Upon engagement of a pawl 63 with its ratchet 61, the shaft 60 will be connected to the rod 70 or 71 through the housing 58 or 58' and the eccentric 59 or 59' associated with the operated pawl. Both pawls 63 having been operated, the rods 70 and 71 will both be connected to the shaft 60 to cause the plows 31 and 32 to oscillate about the pin 52 as a center transversely toward and from each other as the shaft 60 rotates.

Since plow 31 is positioned ahead of plow 32, it is desirable that there be a delayed action in the movement of the plow 32 so that it will not deviate from its course until it reaches the point at which the corresponding plow 31 began to alter its course. This desired action is attained by the use of latches 76 and 77 and the cam 78. For instance, latch 76 is reciprocably mounted on pin 79 to slide relatively, see Figure 4, in apertures located in members 50 and 57. Spring 80 is mounted upon latch 76 in such a manner as to cause this latch to exert a resilient pressure toward housing 58. Latch 77 is reciprocably mounted upon pin 81 and in a circular aperture in member 57. Spring 82 is mounted upon latch 77 to exert a resilient pressure toward housing 58', which is the lower housing.

When the latch 76 is moved forwardly out of engagement with the extending end of the pawl 63, the spring 83 will rotate said pawl about its pivot pin 64 to cause the tooth 66 to engage a tooth 67 of the ratchet 61. This action causes the upper housing 58 to rotate with ratchet 61 and shaft 60 and operate plow 31 as hereinbefore described.

After the upper housing 58 has passed through a predetermined portion of its rotative cycle, cam 78, which is located on the periphery of the upper housing 58 and overlies the upper edge of the lower housing 58', contacts a projection on the latch 77 and forces the latch forward and thereby releases the lower pawl 63. The release of this pawl causes the tooth 66 to engage a tooth 67 of the ratchet 61 and thereby causes the lower housing 58' to rotate with ratchet 61 and shaft 60 to thus impart movement to the plow 32 in the manner hereinbefore described. When the housing 58 completes a revolution its pawl 63 comes in contact with the latch 76 and is thrown out of engagement with the ratchet 61 to thereby conclude the movement of the plow 31. The lower pawl 63 is likewise thrown out of engagement with its associated ratchet 61 by the latch 77.

A bevel gear 84, which is secured to each of the four shafts 60 associated with the four pairs of plows 31 and 32, is driven by a bevel gear 85 which is secured to a shaft 86 or 86'. There are two shafts 86 and 86' (Figs. 1 and 2) which extend laterally of the main frame and are journaled in the bearing projections 87 of the frames 55 as best shown in Fig. 5. The shaft 86 is associated with the two rearward pairs of plows 31 and 32 and the shaft 86' is associated with the two forward pairs of plows 31 and 32.

A V-groove pulley 91, Figures 1 and 7, rotatably mounted on forward shaft 86' is driven by the V-groove pulley 92 through V-belt 93. V-groove pulley 92, as shown in Figure 8, is constructed in such manner as to permit displacement of one of its angular faces, thereby providing means to vary the pitch diameter of said pulley. This arrangement permits the operator to vary the speed at which pulley 91 may be driven in a manner hereinafter described.

The right flange 94 of pulley 92, as illustrated in Figure 8, is keyed to shaft 95 by the key 96. The splined extended hub 97 of said flange 94 cooperates with the splined fitting 98 in the hub 99 of flange 100, thus providing a positive drive for the flange 100 in any of its positions on hub 97. Plate 102 secured to one extremity of shaft 95 by a capscrew 103 holds spring 104 in resilient compression against the outer face of the flange 100. This arrangement enables flange 100 to exert a uniform pressure against the angular face of the V-belt 93 independent of its position on the extended hub 97 of flange 94.

The shaft 95, upon which the V-groove pulley 92 is secured, is journaled in bearings 105 on a bearing bracket 106. Bevel gear 107, pinned to shaft 95, is driven by a bevel gear 108 pinned or otherwise secured to shaft 109 journaled in bearing 110 of bracket 106. A universal joint 111 pinned to shaft 109, as shown in Figure 1, has a squared sleeve 112 joined to its other extremity, said sleeve cooperating with a square shaft 113 fastened to another universal joint 114. Joint 114 is secured in a conventional manner to the power take-off shaft 115 thereby providing the power required to operate the machine.

In order to provide for the automatic operation of plows 31 and 32 for causing their points to spread over the track laterally at predetermined intervals, the plow supporting members 50 are connected by the links 116 and 117 as illustrated in Figure 1. Intermediate link 118 joins cranks 119 secured to members 50. Link 120, more clearly shown in Figure 7, is provided with cuplike sockets at each extremity which cooperate with spherically headed bolts 121 secured to the upturned lower end of member 50 and a hand lever 122 respectively. Hand lever 122 is pivotally mounted upon a pin 124' carried by a bracket 124. The bracket 124 has a hub portion in which is keyed a shaft 123, the shaft 123 being journaled in a bearing 125 carried by a bracket 153. An idler pulley 127 is rotatably mounted upon a stud 128 secured in the upper end of crank 126. It can be readily seen from this description that any lateral displacement of hand lever 122 will cause a similar lateral displacement of all the plows 31 and 32, the movement of the member 50 to which the lever 122 is connected being transferred by the links 116, 117, 118, and 119. Upon longitudinal displacement of the upper end of hand lever 122, the shaft 123 will be rotated to cause pulley 127 to tighten or loosen V-belt 93.

The circular housing 129, see Figure 7, similar to housing 58 except that the eccentric hub 59 has been replaced by a concentric hub 130, is pinned to shaft 86. Pawl 63', which is identical to that used in housing 58', (Fig. 6) is secured to housing 129 in the same manner. The hub of the V-groove pulley 91 extends into the housing 129 and carries a ratchet 131 which is designed to cooperate with the tooth 66 of the pawl 63'. When the pawl and ratchet are in engagement the rotation of the pulley 91 will be transmitted to the shaft 86 through the housing 129.

A latch bar 132 is reciprocally mounted on a bracket 133 by means of a slot 134 which cooperates with a pin 135 on said bracket. An apertured bracket 136, which slidably receives the bar 132, guides the latch in its reciprocation. A spring 137 is mounted upon the bar 132 in such manner as to exert a resilient pressure urging the latch into engagement with the pawl 63'. A bell crank lever 138, pivotally secured to a bracket 139, operates the latch 132 by means of a link 138'. When the pawl 63' is disengaged from the ratchet 131 by the operation of the latch 132, the pulley 91 rotates freely upon the shaft 86, thereby providing a means independent of the tractor power take-off clutch to engage or disengage the cultivator machinery from the power actuator.

To enable the operator to keep the movement or oscillation of the plows 31 and 32 synchronized with the movement of the machine between the rows of plants to be cultivated, a power driven indicator has been provided. This indicator consists of a pointer 140 (see Figs. 1 and 9) mounted upon a power driven disk 141, whose hub is pinned to a shaft 142 journaled in a bracket 143. A bevel gear 144, pinned to shaft 142, is driven by a bevel gear 145 which is mounted in any conventional manner upon a shaft 146. To the opposite extremity of the shaft 146, which is journaled in the extended bearing of the bracket 143, is secured a sprocket 147. A sprocket 148 is secured to the rearward shaft 86 (Fig. 1) and drives the sprocket 147 through a chain 149.

It is to be understood that this indicator continuously rotates at a speed proportionate to the speed of the power take-off and hence proportionate to the speed of movement of the machine over the ground. The indicator is so arranged that as it reaches a hill of plants to be cultivated the pointer 140 will be alined with a cross row of plants and will point directly at a plant in the row along which the right forward pair of plows 31 and 32 is traversing. When for any reason, such as a change in spacing between the plants being cultivated, the pointer 140 is not so alined, the hand lever 122 is to be operated to increase or decrease the speed of the shafts 86 and 86' to bring the pointer 140 into proper alinement.

When the machine is to be manually controlled by four operators, four seats 152 are provided and positioned upon the main frame as illustrated in Fig. 2. Links 116, 117 and 118 are removed, as is also the synchronizing indicator just described. Additional hand levers 122 of the construction illustrated in detail in Figs. 3, 10 and 13 are pivotally mounted upon brackets 153' secured to the frame members 14 and 15. The links 120, hereinbefore described, are attached to the supporting members or straps 50 of each set of the plows 31 and 32. Four levers 150 are also added and these are each pivotally mounted on the link 120 by means of a pin 151. An individual indicator 154 is provided for each operating position and is secured, in any conventional manner, upon the lower plow support straps 51 as illustrated in Figs. 4 and 13.

To manually operate the mechanism actuating plows 31 and 32, the button 155, Figures 10 and 13, is depressed and through link 156 actuates the lever 157 pivotally mounted on a pin 158 secured in a bracket 159 secured to the lever 122. Lever 157 forces one end of lever 150 rearwardly thereby causing the other end of lever 150, which slidably receives the latch 76 and is held thereon by cotter key 160, forwardly to thereby operate said latch and release the pawl 63 to actuate the plows 31 and 32 in the manner hereinbefore described.

Operation

For the first cultivating and blocking operation the machine is to be operated automatically, and accordingly the latches 76, associated with the four pairs of plows 31 and 32, are pulled forwardly to released position and held in that position throughout the entire cultivating operation by inserting pins in circular apertures 161 in the latch rods 76. Any other means for holding the latches in forward position may be utilized. The lever 138, Fig. 7, is then moved forward and held in a forward position by a catch 162. Forward movement of the lever 138 causes the latch 132 to release pawl 63', and said pawl engages with the ratchet hub 131 of pulley 91. Power from the tractor power take-off 115 is transmitted to shaft 86' through shaft 109, double gears 107 and 108, shaft 95, pulley 92, belt 93, pulley 91, and housing 131. Power from the forward shaft 86' is transferred to the rearward shaft 86 by sprockets 164 and 163 and chain 165, the sprockets 163 and 164 being attached to their respective shafts. Bevel gears 85 attached to shafts 86 and 86' drive shafts 60 through bevel gears 84. Each shaft 60 drives the pair of housings 58 and 58' through ratchets 61 and pawls 63 attached to said housings. The rotation of the eccentric hubs of the housings 58 and 58' operates the rods 70 and 71 through straps 72 and 73. The rods 70 and 71, through arms 74 and 75 and brackets 48 and 49, cause plows 31 and 32 to oscillate about the pin 52 as a center.

As previously stated, the latch 77 is operated by the cam 78 a predetermined time after the release of the latch 76. Therefore, the plow 32 will start to oscillate the same predetermined time after the plow 31 has started to oscillate and at the same point along the longitudinal axis of the row of plants. Because the latch 76 is held in released position by the pin in the aperture 161, the oscillation of the plow 31 will be continuous and the latch 77 will be released by the constantly rotating cam 78 in each cycle of the revolution. The oscillation of the plow 32 will therefore also be continuous but displaced in time phase with respect to the oscillation of the plow 31. The course which each set of plows 31 and 32 will follow during the first cultivating operation is shown in Fig. 11.

The four pairs of plows 31 and 32 are maintained in alinement with the center line of the rows of plants by means of the hand lever 122, Fig. 1. Every lateral adjusting movement of the lever 122 is transferred to the four pairs of plows 31 and 32 by links 120, 116, 117, 118 and cranks 119.

If it be desired to increase the speed of the opening and closing of the plows 31 and 32, the upper end of hand lever 122 is moved forward to rotate shaft 123, Figures 7 and 13, and cause crank 126 to lower idler pulley 127, thus relieving the pressure on the belt 93. The spring 104 then forces the angular faces of the pulley 92 closer together, causing the belt to ride further out from the center of the pulley, thus increasing the speed of the drive shafts 86 and 86' and the oscillation of the plows 31 and 32. When a decrease in the speed of oscillation of the plows 31 and 32 is desired, the lever 122 is pulled rearwardly to increase the pressure of the pulley 127 against the belt 93 and to cause the faces of the pulley 92 to spread further apart.

The operation of the machine for the second cultivating operation or step is practically the same except that the operator must now maintain the pointer 140 of the indicator alined with the rows of plants being cultivated. This is accomplished by manipulating the lever 122 to maintain the oscillation of the plows 31 and 32 in synchronism with the movement of the cultivating machine between the rows of plants.

For the performance of the third, or last, cultivating step, four operators are required. The links 116, 117 and 118 are removed and replaced by additional levers 120, 122, 150 and 155 so that each pair of plows 31 and 32 may be operated independently of each other pair, and the pins theretofore inserted in the apertures 161 of the latch rod 76 are removed to restore the control of these latches to the buttons 155. The speed of the shafts 86 and 86' now remains practically constant, the hand lever 122 being used merely to maintain each set of plows in proper alinement with its respective row of plants.

As hereinbefore mentioned, an indicator 154, Fig. 4, is attached to each member 51. When a plant is immediately beneath a pointer 154, the button 155 is momentarily depressed to actuate levers 157 and 150 and retract the latch 76, the retraction of the latch releasing the pawl 63 and coupling the shaft 60 to the rod 70 to operate the plow 31. During the interval required for plow 32 to reach the point at which plow 31 started to operate, the cam 78 reaches and trips latch 77, the lower pawl 63 being thereby released to couple the shaft 60 to the rod 71 to operate plow 32. Springs 80 and 82 reset latches 76 and 77 when pressure on button 155 is released; thus when one revolution of the housings 58 and 58' has been completed the plows 31 and 32 will assume the same position they held in respect to one another at the start of the herein described cycle of operation. This same operation is repeated each time a plant is encountered, each operator actuating his pair of plows 31 and 32 independently of the other operators. The action of said plows in the operation described is diagrammatically shown in Figure 12. It may be noted however, that the plows 31 and 32 will continue to move in and out as long as the operator continues the downward pressure on the button 155.

The method of cultivation described has been for plants that have been drilled. When seeds have been planted in hills, the first or blocking operation is omitted and the second method of semi-automatic operation is used first.

It is understood that the machine is not limited to the three cycles of cultivation in the order they have been described. Since all the cultivation is accomplished longitudinally with respect to the rows of plants, the machine is of great advantage in irrigated districts where it is impossible to cross cultivate between the plants because of interference with the flow of water between the rows.

What I claim as new and desire to secure as Letters Patent of the United States is:

1. In a cultivating device the combination of a support adapted to move over the ground substantially parallel to a row of plants to be cultivated, shiftable cultivating means on said support, variable power operated means adapted to actuate said cultivating means in synchronism with the travel of the support over the ground, control means for maintaining the cultivating means on said support in proper spaced relation to the longitudinal axis of the row of plants to be cultivated and movable to adjust said variable power operating means to vary the synchronous relation between the movement of the cultivating means and the movement of the support over the ground.

2. In a cultivating apparatus the combination of a support adapted to travel at an adjustably predetermined rate over the ground in a direction substantially parallel with a row of plants, cultivating means shiftably mounted on said support, variable speed power actuated means for operating said cultivating means in synchronism with the rate of travel of the support over the ground for cultivating plants, shiftable control means on the support adapted to be actuated in one direction for shifting the cultivating means relative to the support to position the cultivating means relative to the row of plants and shiftable in another direction to alter the synchronized relation between the rate of movement of the cultivating means and the rate of travel of the support over the ground.

3. In a cultivating device for cultivating a row of plants, the combination of a support adapted to travel over the ground in a direction substantially parallel with a row of plants to be cultivated, at least two cultivator shiftably mounted on said support, one in advance of the other with respect to the direction of travel of the support relative to the row of plants, power actuated means for actuating said cultivators to cause the same to move angularly with respect to each other and to the row of plants as the support travels along the ground whereby to cause said cultivators to move toward and from each other, to cross the longitudinal axis of the row of plants and to cross the path of travel of the other cultivator.

4. In a cultivator the combination of a support adapted to travel over the ground substantially parallel to a plurality of parallel disposed rows of plants to be cultivated, a plurality of separate cultivating means on said support, one means for each row, variable speed power actuated means operated in synchronism with the rate of travel of the support over the ground for imparting a continuous succession of recurring movements to each of said cultivating means, and a single control means under the control of a single operator on the support for altering the relation between the movements of the cultivators and the rate of movement of the support over the ground.

5. In a cultivator the combination of a support adapted to travel over the ground in a direction substantially parallel to a row of plants to be cultivated, cyclically movable cultivating means on said support, power actuated means for operating said cultivating means and manually actuated means under the control of an operator on the support for causing said power operated means to operate said cultivating means to complete a single cyclical movement or selectively to complete a whole number of cyclical movements as the support travels along the ground.

6. In a cultivator the combination of a support adapted to travel over the ground in a direction substantially parallel to a row of plants to be cultivated, operable cultivating means on said support, variable speed power actuated means for cyclically operating said cultivating means, manually actuated means under the control of an operator on the support for causing said power operated means to operate said cultivating means to complete a single cyclical movement or selectively to complete a number of cyclical movements as the support travels along the ground, means for controlling said power actuated means to cause said means to move the cultivating means in synchronism with the travel of the support over the ground and means under the control of the operator for varying such synchronous relation.

7. In a cultivator the combination of a support adapted to travel over the ground substantially parallel to a row of plants to be cultivated, at least two cultivators shiftably mounted on said support, power actuated means including mechanism for operating one of said cultivators, and mechanism responsive to the operation of said first mechanism for operating the other cultivator in timed relation to the movement of the first cultivator.

8. In a cultivator the combination of a support adapted to travel over the ground substantially parallel to a row of plants to be cultivated, a pair of cultivators on said support, power actuated means on said support, a shaft to be driven thereby, clutch means between said shaft and one of said cultivators, and additional clutch means between said shaft and the other cultivator, and mechanism actuated by one of said clutch means for operating the clutch means of the other cultivator, and manually actuated means for controlling the actuation of said clutch means.

9. In a cultivator the combination of a support adapted to travel over the ground substantially parallel to a row of plants to be cultivated, cyclically movable cultivating means on said support, power actuated means on said support, control means for causing said power actuated means to operate said cultivating means in a continuous succession of complete cyclical movements as the support travels over the ground and control means for causing said power actuated means to move said cultivating means in single cyclical movements solely at the will of the operator instead of moving continuously and repeatedly.

10. A cultivating machine comprising a support adapted to travel over the ground substantially parallel to a row of plants to be cultivated, a cultivator, means for shiftably mounting said cultivator on said support, power driven operating means for moving said cultivator transversely of a row of plants to be cultivated, manually operable means for controlling said power driven operating means to selectively cause said operating means to move said cultivator continuously whereby to cultivate the ground between predeterminedly spaced hills of plants, or discontinuously whereby to remove a desired number of plants from each of the said predeterminedly spaced hills of plants, and a second manually operable means connected to said shiftable mounting means for maintaining said cultivator in proper spaced relation to the longitudinal axis of the row of plants being cultivated.

11. In a cultivating machine comprising a support adapted to travel over the ground substantially parallel to a row of plants to be cultivated, a cultivator, a supporting frame pivoted to said support for universal movement with respect to said support, means for mounting said cultivator upon said supporting frame for oscillating movement relative thereto, means for oscillating said cultivator, and manually operable means connected to said supporting frame for tilting the same vertically to control the depth of cut of said cultivator and for rotating the same horizontally to maintain said cultivator in proper alinement with respect to the longitudinal axis of the row of plants to be cultivated.

12. A cultivating machine comprising a support adapted to travel over the ground substantially parallel to a row of plants to be cultivated, a cultivator shiftably mounted upon said support, an indicator mounted upon said support, variable speed power operated means for operating said cultivator and said indicator in synchronism with the movement of the support between the hills of plants to be cultivated, and manually operated speed control means for maintaining said synchronized relation.

13. A cultivating machine comprising a support adapted to travel over the ground substantially parallel to a plurality of rows of plants to be cultivated, a plurality of cultivators shiftably mounted upon said support for oscillation transversely of the rows of plants, a rotatable indicator mounted upon said support, variable speed power operated means for oscillating said cultivators and rotating said indicator in synchronism with the movement of the support between the transverse rows of plants to be cultivated, means for simultaneously adjusting all of said cultivators to maintain them in proper longitudinal alinement with their respective rows of plants, speed control means for maintaining the synchronized relation between the cultivator, the indicator and the movement of the support, and a single manually operable lever for selectively operating said adjusting means and said speed control means.

14. In a cultivating machine, the combination of a support adapted to travel over the ground substantially parallel to a row of plants to be cultivated, a pair of cultivator elements shiftably mounted on said support in longitudinally staggered relation, power operated means for actuating said cultivator elements in timed relation to cause the same to oscillate laterally of the support along intersecting paths beginning at the same point in the longitudinal axis of the row of plants and extending across the longitudinal axis of said row of plants.

15. In a cultivating machine, the combination of a support adapted to travel over the ground in a direction substantially parallel to a row of plants to be cultivated, a pair of cultivator elements shiftably mounted on said support in longitudinally staggered relation, power operated means adapted to be connected to said cultivator elements to oscillate the same laterally of the support along intersecting paths across the longitudinal axis of the row of plants, individual clutch means for connecting said power operated means to each of said cultivator elements, manually operable means for controlling one of said clutches, and means operated by said one clutch for controlling the other clutch to cause a predetermined delay between the operation of the cultivator elements whereby the oscillations of said elements are initiated at the same point along the longitudinal axis of the row of plants.

16. In a cultivator, the combination of a support adapted to travel over the ground in a direction substantially parallel with a row of plants to be cultivated, a pair of cultivators shiftably mounted on said support, variable speed power operated means for shifting the cultivators simultaneously in opposite directions laterally of the path of travel of the support, and means for selectively controlling said power operated means to cause said means to shift said cultivators in continuous cyclic movements throughout the entire length of the row or to shift said cultivators in single cyclical movement under the control of the operator.

17. In a cultivator the combination of a support adapted to travel over the ground in a direction substantially parallel to a row of plants, a plurality of cultivators shiftably mounted thereon, variable speed power operated means for shifting the cultivators angularly with respect to the path of travel of the support in synchronism with the movement of the support over the ground and continuously variable speed control means for varying the rate of movement of the cultivators with respect to the rate of movement of the support over the ground.

18. In a cultivator the combination of a support adapted to travel over the ground in a direction substantially parallel to a row of plants, a plurality of cultivators shiftably mounted thereon, power operated means for shifting the cultivators angularly with respect to the path of travel of the support, control means for initiating operation of one of the cultivators and automatically operable means for initiating the operation of another of said cultivators a predetermined time after initiation of the operation of said first cultivator.

19. In a cultivating device the combination of a vehicle adapted to travel over the ground in a direction substantially parallel with a row of plants, a pair of cultivators shiftably mounted on said vehicle, variable speed power actuated means for driving said cultivators, continuously variable speed changing control means for causing each of the cultivators to move at a rate in synchronism with the rate of travel of the vehicle along the row of plants, said power actuated means including mechanism for causing said cultivators to move periodically toward and from each other across the longitudinal axis of the row of plants and along intersecting paths of travel.

20. In a cultivating device the combination of a support adapted to travel over the ground in a direction generally parallel with a row of plants, a pair of longitudinally spaced cultivators shiftably mounted on said support, variable speed power actuating means for driving said cultivators, means for controlling said power actuated means to cause each of the cultivators to move in substantial synchronism with the travel of the support along the row of plants, said power actuated means including mechanism for causing said cultivators periodically to move angularly with respect to each other and to the row of plants, as the support travels along the ground whereby to cause said cultivators to move toward and from each other, to cross the longitudinal axis of the row of plants and to cross the path of travel of the other cultivator and control means for causing said power actuated means to shift said cultivators in timed relation whereby the shifting movement of each cultivator begins at the same point along the longitudinal axis of the row of plants.

21. In a cultivating machine, the combination of a vehicular support, a cyclically movable cultivator mounted on said support, variable speed power actuated means for operating said cultivator and selective control means for causing said power actuated means to move said cultivator in a continuous succession of complete cyclical movements in synchronism with the movement of the vehicular support or discontinuously in single, complete cyclical movements under the control of an operator.

22. A cultivating machine comprising a vehicular support adapted to travel over the ground substantially parallel to a plurality of rows of plants to be cultivated, a plurality of cultivators shiftably mounted upon said support, power means for moving said support to cause said plurality of cultivators to move longitudinally of the rows of plants, variable speed operating means actuated by said power means for causing each of said cultivators to move transversely of a row of plants between predetermined, spaced apart hills of plants to be cultivated, a single manually adjustable means for simultaneously shifting all of said cultivators relative to said support to maintain said cultivators in proper alignment with their respective rows of plants, and a single manually adjustable means for controlling the speed of operation of said operating means to maintain the transverse movements of all the cultivators in synchronism with the rate of travel of the support over the ground.

WILLIAM E. URSCHEL.